United States Patent [19]

Kao

[11] Patent Number: 5,546,497
[45] Date of Patent: Aug. 13, 1996

[54] METHOD OF AND AN APPARATUS FOR ELIMINATING BACKGROUND NOISE IN DIGITAL SOUND RECORDING

[75] Inventor: Oliver C. K. Kao, Hsin-Chu, Taiwan

[73] Assignee: United Microelectronics Corp., Hsin-Chu City, Taiwan

[21] Appl. No.: 236,925

[22] Filed: May 2, 1994

[51] Int. Cl.⁶ .................................................. G01L 3/02
[52] U.S. Cl. .............................. 395/2.35; 381/46; 360/32
[58] Field of Search .............................. 395/2.35, 2.36, 395/2.37, 2; 381/46, 47, 51; 360/32, 36.2

[56] References Cited

U.S. PATENT DOCUMENTS

| 4,636,876 | 1/1987 | Schwartz | 395/2 |
| 5,212,764 | 5/1993 | Ariyoshi | 381/46 |

*Primary Examiner*—Kee M. Tung
*Attorney, Agent, or Firm*—Barnes, Kisselle, Raisch, Choate, Whittemore & Hulbert, P.C.

[57] ABSTRACT

A method of suppressing background noise in a digital sound recording and reproducing system includes the steps of preselecting a specific voltage range to be considered to contain substantially all background noise, selecting a quiet sound benchmark voltage taken as zero output, defining a number of least significant bits of a digital sound signal confining the noise, defining voltages corresponding to the number of least significant bits, and replacing these voltages within the voltage range for both positive and negative most significant bits around the benchmark voltage with the benchmark voltage which clears sound signals from this type of noise. An apparatus for practicing the method employs logic circuitry providing suppression of signals within the preselected range.

6 Claims, 5 Drawing Sheets

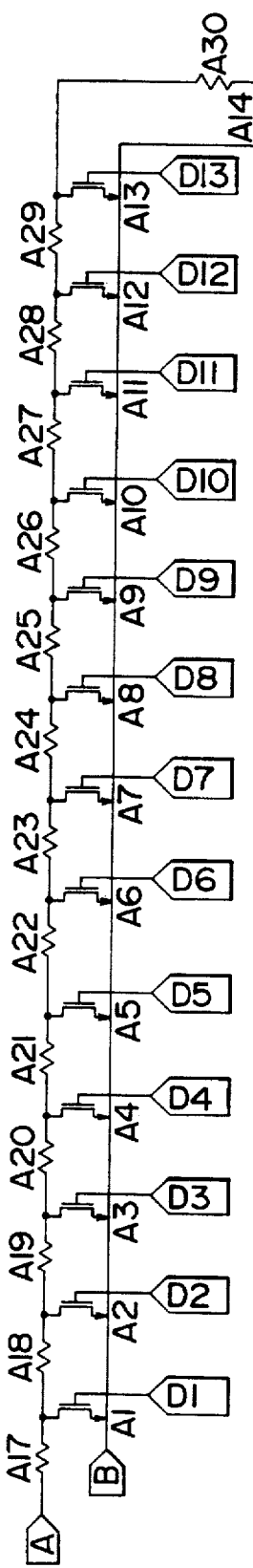
FIG 10
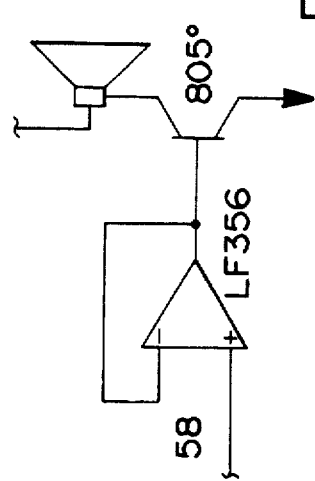
FIG 11
FIG 8B

METHOD OF AND AN APPARATUS FOR ELIMINATING BACKGROUND NOISE IN DIGITAL SOUND RECORDING

FIELD OF THE INVENTION

The present invention generally relates to a method and an apparatus for eliminating background noise in a digital sound recording, and more particularly, relates to a method and an apparatus for eliminating background noise in a digital sound recording by changing the digital sound signals within a preselected amplitude range where the background noise is most pronounced to a quiet signal level or to a negligible value.

BACKGROUND OF THE INVENTION

In recent years, digital voice recording techniques have gradually replaced the traditional methods of analog recording which are typically bulky and difficult to carry out. Digital voice recording apparatus has the benefits of small volume, low consumption of electricity and a large variety of different applications. It is gaining wide popularity in consumer electronic goods such as talking greeting cards, phone answering machines and a variety of talking toys.

When a digital sound recording apparatus is used by an operator to record a sound in a certain environment, there is a high likelihood that background noise exists in that environment which is caused by either electrically operated equipment such as computers, air conditioning units and other office machines or other uncontrollable situations such as passing cars, human voices, etc. This unwanted noise is recorded together with the intended audio signals by the digital recording system and thus deteriorates the quality of the total sound recording.

Eliminating noise in a digital recording system has been of principal concern since the advent of the technology. In analog sound systems, noise is in the form of additive white Gaussian noise which is spectrally constant and benign to a listener; this noise background is considered benign since it is uncorrelated with the audio signal. There are numerous methods of reducing noise and distortion in analog systems, they can often be minimized through stringent design and manufacture of their components.

Noise and distortion in a digital system such as digital sound recording are of a different nature. They can be correlated with the signal, that is, they change according to the signal behavior. A correlated noise seems to increase perceptually at low signal levels and can be quite audible.

Known in the art are various methods of dealing with noise in digital systems. They often require an investigation of the critical band concept and masking curves, i.e. to relate distortion and noise to the human auditory mechanism. The basic idea in suppressing noise lies in "decorrelating" it by reducing it to a low-level noise floor. Nevertheless, the problem of noise in digital systems is not solved since either noise cannot be completely eliminated or the solution to complete eliminating proves to be too expensive.

It is therefore an object of the present invention to provide a method of eliminating background noise in a digital sound recording/playback system such that the quality of the sound can be improved.

It is another object of the present invention to provide a method of eliminating background noise in a digital sound recording/playback system which eliminates background noise in the recording while not significantly increasing the cost of the equipment.

SUMMARY OF THE INVENTION

In accordance with the present invention, a method of and an apparatus for reducing background noise in a digital sound recording/playback system are provided.

In the preferred embodiment, a sound signal is first processed by a speech process unit which changes the analog voice signals into digital signals. The digital voice signals are then fed into a noise elimination unit wherein all signals within a preselected voltage range representing noise signals are converted to a quiet signal level zero. These corrected voice signals are then fed into a digital-to-analog circuit for a conversion back into analog signals. The analog signals are then sent through an output circuit for a voice playback. The method effectively eliminates all background noise signals within a certain amplitude range such that only the desirable sound signals are audible during the playback.

Further advantageous details and embodiments of the invention will be clearly understood from the ensuing detailed description in connection with the accompanying drawings.

BRIEF DESCRIPTION OF THE DRAWINGS

FIGS. 8A and 8B are functional block diagram of a digital-to-analog conversion unit.

FIGS. 9 and 10 are schematic diagrams of the digital-to-analog converter.

FIG. 11 is an example of the output circuit implementation of the apparatus according to the present invention.

DESCRIPTION OF THE PREFERRED EMBODIMENTS OF THE INVENTION

Figure 1:
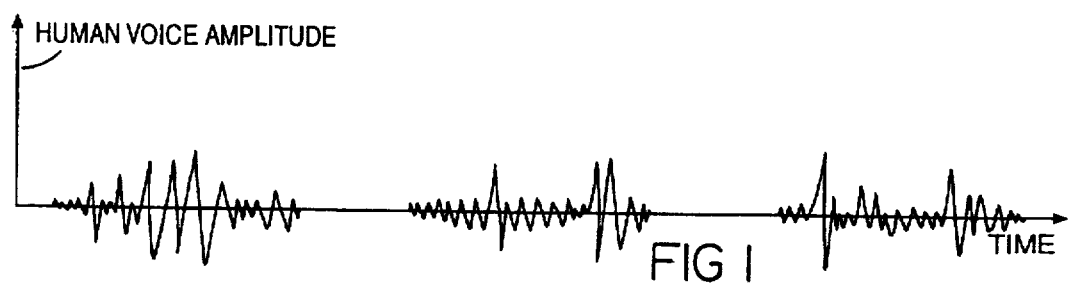
FIG. 1 is an amplitude-time plot of human voice sound waves.
Figure 2:
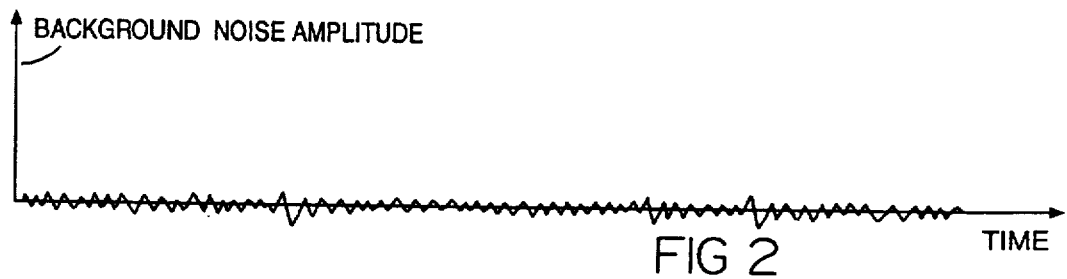
FIG. 2 is an amplitude-time plot of a low amplitude background noise.
Figure 3:
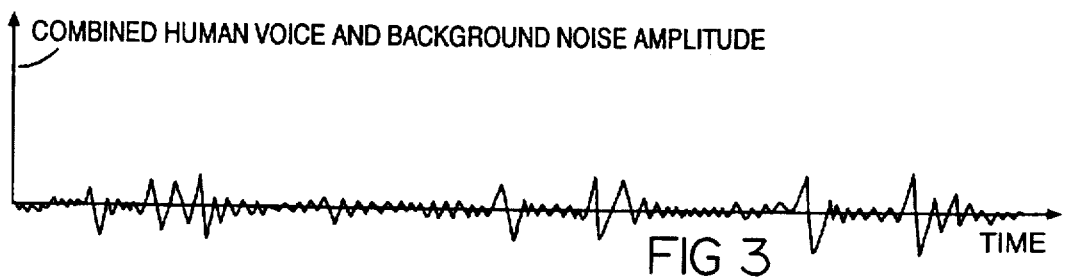
FIG. 3 shows an amplitude-time plot of a human voice combined with the background noise.

Referring now to FIG. 1, an illustration of typical sound waves of a human voice is plotted as a voltage amplitude on a time axis. The three sound waves shown in FIG. 1 represent three separate words. There are no sound waves connecting the three words and therefore it is assumed to be quiet between the words. If there is background noise in the environment where the recording has taken place, even though there are no other significant sound waves, there is a low amplitude sound wave caused by the background noise; this is shown in FIG. 2. These background noise sound waves interfere with other sound waves that are of low amplitude. If a recording is started in the presence of a background noise similar to that of FIG. 2, the end result recorded is a combination of the sound waves shown in FIGS. 1 and 2 which produces a composite sound wave such as that shown in FIG. 3. The present invention can effectively eliminate the background noise waves from the signals shown in FIG. 3 so that the quality of the corrected sound waves can be significantly improved.

Figure 5:
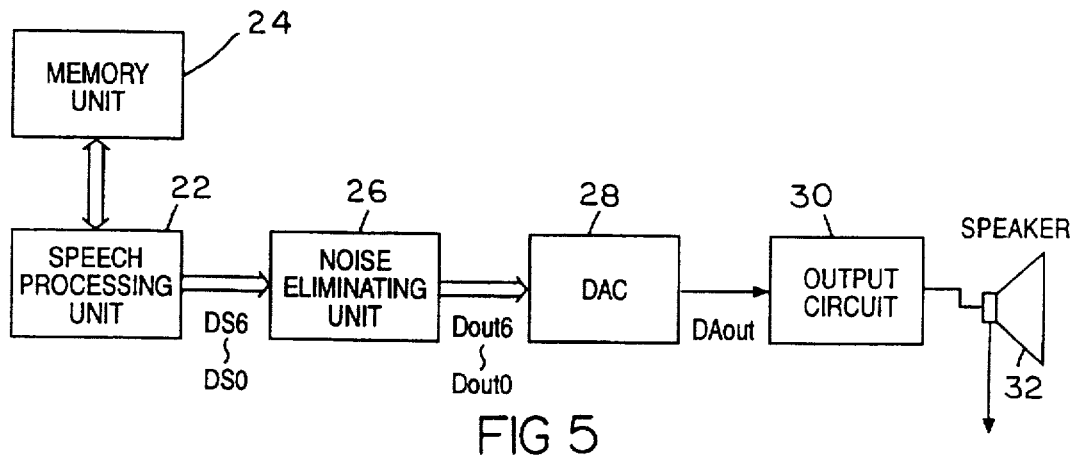
FIG. 5 is a block diagram illustrating one embodiment for carrying out the present invention.

To further illustrate the invention, a block diagram of an apparatus 20 for practicing the method of the present invention is shown in FIG. 5 wherein 22 is a speech processing unit, 24 is a memory unit for storing speech codes, 26 is a noise elimination unit, 28 is a digital-to-analog conversion unit (shown in detail in FIGS. 8A and 8B), and 30 is an output circuit which has a speaker 32 as a load.

During a sound recording session, the voice is translated into a speech code by the speech process unit 22 and then stored in the memory unit 24. Both procedures are carried out by conventional means known by those skilled in the art. During playback, the speech code is retrieved from the memory unit 24 and sent back to the speech process unit 22 to reproduce the voice. Assuming that the speech code after being processed by 22 is delivered to the digital-to-analog converter 28, the result shown in FIG. 3 which contains the background noise sound waves is obtained. However, if the speech code is first processed by the noise elimination unit 26, the background noise can be effectively eliminated.

EXAMPLE 1

In Example 1, a 6-bit output of unit 22 is presented. A 2.5 V value is set as a benchmark for a quiet sound. The total range of voltage variation within which the background noise is to be suppressed is chosen between the range of 1 V to 4 V as that shown in FIG. 4. The least significant bit (LSB) represents a $3 \text{ V}/2^6 = 0.0468$ V change. Two LSB represent $0.0468 \times 4 = 0.187$ V in a total 3 V range of the variation. By recognizing that all background noise is confined within two LSB for both positive and negative most significant bits around the 2.5 V level, it is proposed, in order to filter out all background noise, to replace all the signals within the voltage range between 2.64 V and 2.313 V with the 2.5 V quiet sound benchmark voltage. This is shown in Table I.

Table I illustrates the digital sound wave data received from a 6-bit output of the unit 22, including the voltage changes of sound signals after the noise elimination treatment. The relative positions of the sound signals to the quiet sound benchmark is represented by the most significant bit (MSB) to indicate a positive or negative relationship. When the MSB is 0, it indicates a signal at above the quiet sound benchmark. When the MSB is 1, the sound signal is below the quiet sound benchmark.

TABLE I

| Starting Voltage | Digital Signal Before Treatment | Digital Signal After Treatment | Ending Voltage |
|---|---|---|---|
| 4.0 | 011111 | 011111 | 4.0 |
| 2.781 | 000110 | 000110 | 2.781 |
| 2.734 | 000101 | 000101 | 2.734 |
| 2.687 | 000100 | 000100 | 2.687 |
| 2.640 | 000011 | 000000 | 2.50 |
| 2.594 | 000010 | 000000 | 2.50 |
| 2.546 | 000001 | 000000 | 2.50 |
| 2.50 | 000000 | 000000 | 2.50 |
| 2.454 | 111111 | 000000 | 2.50 |
| 2.406 | 111110 | 000000 | 2.50 |
| 2.360 | 111101 | 000000 | 2.50 |
| 2.313 | 111100 | 000000 | 2.50 |
| 2.266 | 111011 | 111011 | 2.266 |
| 2.219 | 111010 | 111010 | 2.219 |

TABLE I-continued

| Starting Voltage | Digital Signal Before Treatment | Digital Signal After Treatment | Ending Voltage |
|---|---|---|---|
| 1.0 | 100000 | 100000 | 1.0 |

The present invention therefore selects a predetermined digital signal voltage range for the sound waves as the background noise, and processes these sound waves to change them into a quiet sound benchmark voltage, thus eliminating the noise signals.

EXAMPLE 2

Figure 4:
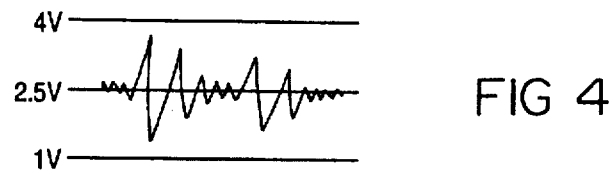
FIG. 4 shows an amplitude-time plot of acoustic waves confined in a 1–4 V range chosen for dealing with the noise according to the present invention.
Figure 6A:
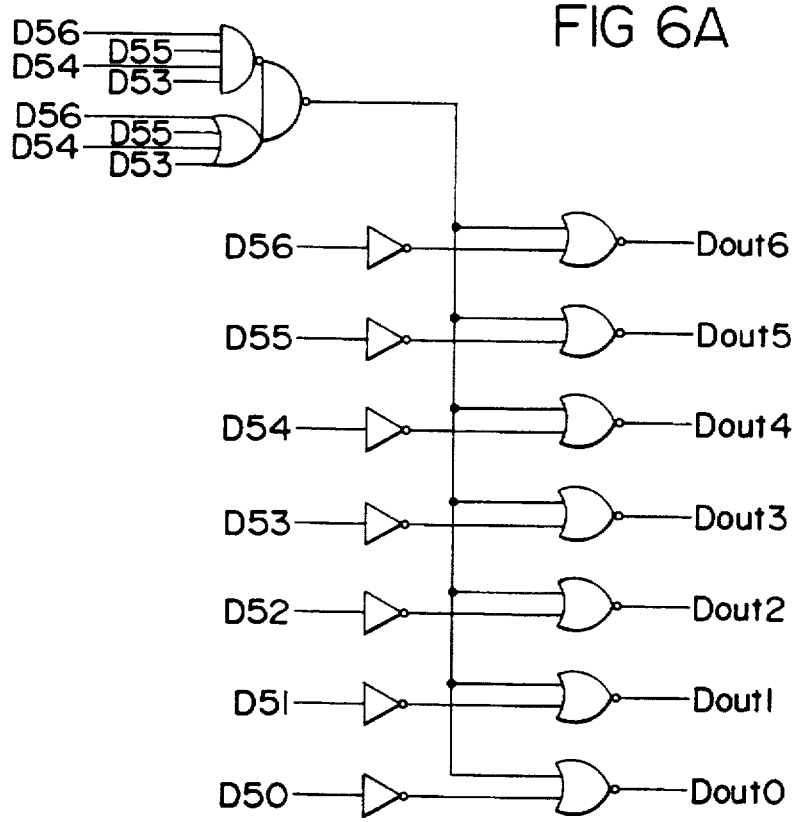
FIGS. 6A, 6B and 7 show two 7-bit embodiments and a 9-bit embodiment respectively of the logic portion of a noise elimination circuit according to the present invention.
Figure 6B:
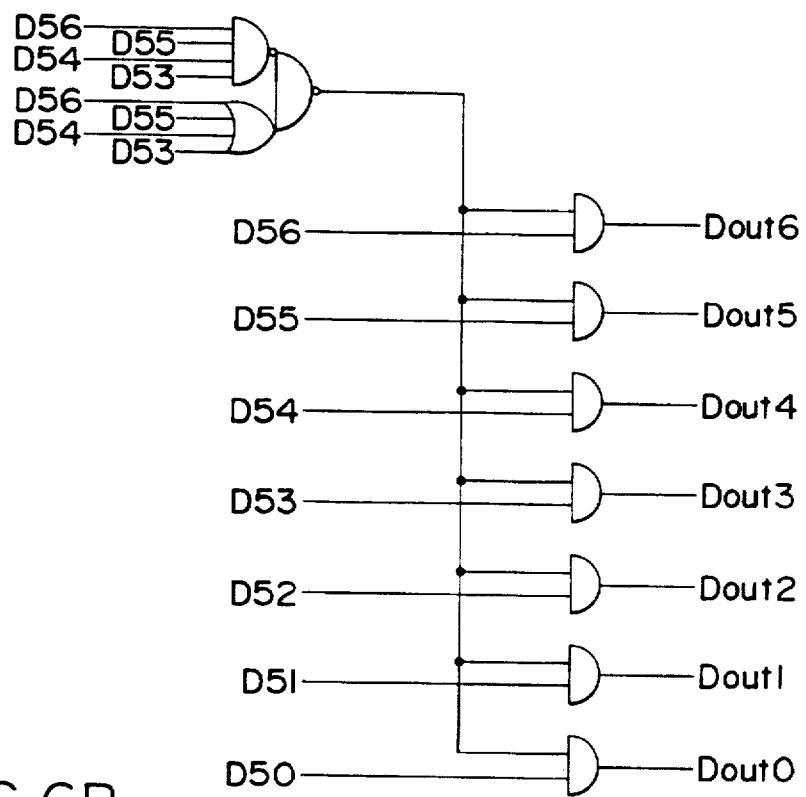

The processing of a 7-bit output from the speech processing unit 22 is shown as Example 2. The process described in Example 2 follows the same flow chart of FIG. 5. During playback, a 7-bit output of DS6~DS0 is obtained from the speech processing unit 22 and fed into the noise elimination unit 26. The latter may have a logical diagram as shown in FIG. 6A or FIG. 6B. The output voltage range is preset at between 1~4 V with a midpoint of 2.5 V, as shown in FIG. 4. The 3 V total voltage range is divided by $2^7$ into 128 increments. Each incremental part is therefore $3 \text{ V}/128 = 0.02344$ V. Table II shows the digital signals of the sound wave and the digital signal voltage before and after processing by the noise elimination unit 26.

TABLE II

| Starting Voltage | Digital Signal Before Treatment | Digital Signal After Treatment | Ending Voltage |
|---|---|---|---|
| 4.0 | 0111111 | 0111111 | 4.0 |
| . | . | . | . |
| . | . | . | . |
| . | . | . | . |
| 2.687 | 0001000 | 0001000 | 2.687 |
| 2.664 | 0000111 | 0000000 | 2.5 |
| . | . | . | . |
| . | . | . | . |
| . | . | . | . |
| 2.5 | 0000000 | 0000000 | 2.5 |
| 2.5 | 1111111 | 0000000 | 2.5 |
| 2.476 | 1111110 | 0000000 | 2.5 |
| . | . | . | . |
| . | . | . | . |
| . | . | . | . |
| 2.336 | 1111000 | 0000000 | 2.5 |
| 2.3125 | 1110111 | 1110111 | 2.3125 |
| . | . | . | . |
| . | . | . | . |
| . | . | . | . |
| 1.002 | 1000000 | 1000000 | 1.0 |

The MSB in this 7-bit example indicates if the response voltage is above (MSB is 0) or below (MSB is 1) the midpoint of 2.5 V. This 7-bit system is expressed by a system of 2's complement.

When the chosen voltage range for the background noise is between 2.664 and 2.336 V, which can also be expressed in a 7-bit system by the value of 0000111 and 1111000, sound waves having a voltage within this range are treated as the background noise shown in FIG. 2. In fact, logic diagrams of the noise eliminating unit 26 shown in FIGS. 6a and 6b form logical zeros at the outputs Dout 0–Dout 6 if inputs D53~D56 have all ones or all zeros, irrespective of the logic state of the three LSB at the rest of the inputs D50~D52. Therefore, this logic can reduce to zero all variations of voltages within the three LSB provided that the four MSB are all ones or all zeros which is exactly the above mentioned range between 0000111 and 1111000. The digital sound voltage values outside this range are not changed.

EXAMPLE 3

Figure 7:
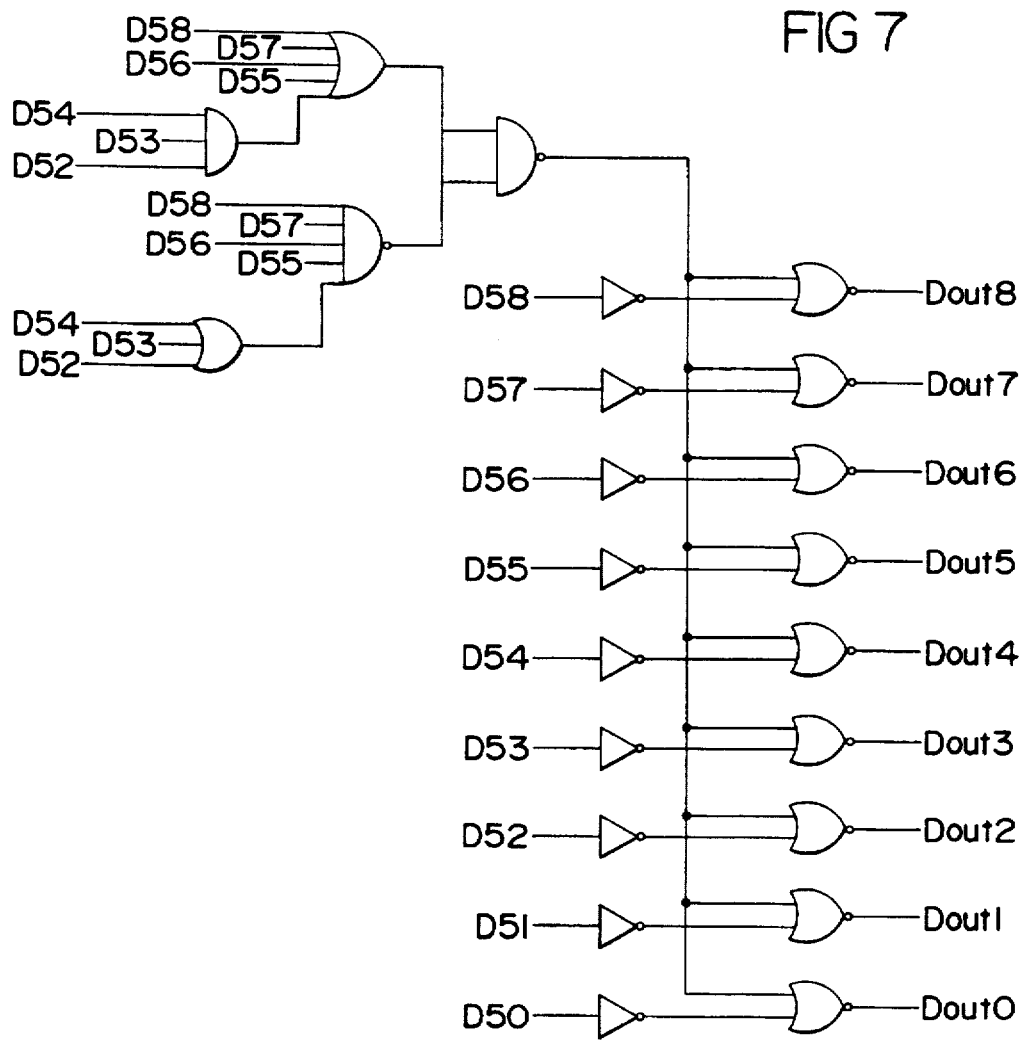

Noise elimination for the case of a 9-bit output signal from the speech processing unit 22 is shown as Example 3. Similar to Example 2, within the range of between 1 V to 4 V, the total voltage range is divided this time by $2^9$ into 512 increments. Each equal increment would be 3 V/512= 0.00586 V. If the selected voltage range for the background noise lies between 2.658 and 2.341 V, or in a 9-bit system from 000011011 to 111100100, all digital sound signals in this range are treated as the background noise signals shown in FIG. 2. To eliminate these background noise signals, the logical diagram in FIG. 7 can be used to obtain the corrected data at outputs Dout 0–Dout 8 of the noise eliminating unit 26 that is illustrated by Table III. The diagram in FIG. 7 forms logic zeros at the outputs Dout 0–Dout 8 if inputs D55–D58 have all ones or all zeros, irrespective of logic state at the rest of the inputs D50–DS4. Therefore, this logic can reduce to zero all variations of voltages within the five LSB provided the four MSB are all ones or all zeros which coincides with the range between 000011011 and 111100100. The digital sound voltages outside this range are not changed.

TABLE III

| Starting Voltage | Digital Signal Before Treatment | Digital Signal After Treatment | Ending Voltage |
| --- | --- | --- | --- |
| 4.0 | 011111111 | 011111111 | 4.0 |
| . | . | . | . |
| . | . | . | . |
| . | . | . | . |
| 2.6641 | 000011100 | 000011100 | 2.6641 |
| 2.6582 | 000011011 | 000000000 | 2.5 |
| . | . | . | . |
| . | . | . | . |
| . | . | . | . |
| 2.547 | 000000010 | 000000000 | 2.5 |
| 2.5058 | 000000001 | 000000000 | 2.5 |
| 2.50 | 000000000 | 000000000 | 2.5 |
| 2.50 | 111111111 | 000000000 | 2.5 |
| 2.494 | 111111110 | 000000000 | 2.5 |
| . | . | . | . |
| . | . | . | . |
| . | . | . | . |
| 2.341 | 111100100 | 000000000 | 2.5 |
| 2.336 | 111100011 | 111100011 | 2.33 |
| . | . | . | . |
| . | . | . | . |
| . | . | . | . |
| 1.006 | 100000000 | 100000000 | 1.0 |

The digital-to-analog converter 28 shown in FIG. 5 transforms the digital output from the noise elimination unit 26 of Dout 6–Dout 0 into corresponding analog voltage values. These voltage values indicate a range of 1 V to 4 V as shown in FIG. 4.

Figure 8A:
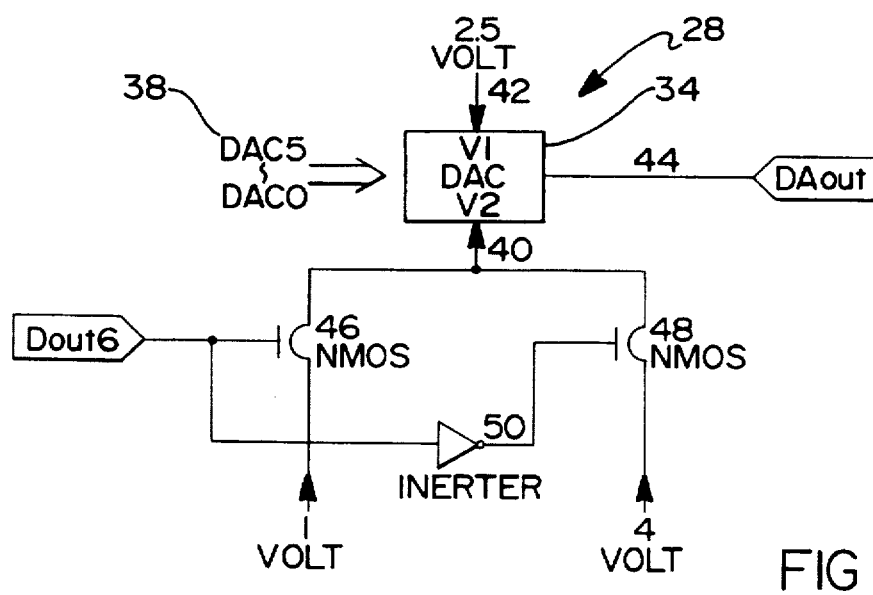

FIGS. 8A and 8B show an overall circuit for the 9-bit system. The circuit consists of a DAC (digital-to-analog convertor) 34 and an additional circuitry. DAC 34 has digital logic inputs DAC 0–DAC 5 38, power inputs 40 (for either 1 V or 4 V) and 42 (for 2.5 V), and an analog output 44. For the 7-bit case, it is the MSB output Dout 6 from noise eliminating unit 26 that controls circuitry having two NMOS transistors 46 and 48, and inverter 50, and supplies 1 V or 4 V to input 40 of DAC 34. 1 V is supplied to input 40 when Dout 6 is in "1" state, and 4 V is input when Dout 6 is in "0"

state. Digital outputs Dout 5–Dout 0 from noise eliminating unit 26 are suitably transferred to DAC 5–DAC 0 by means of a set of EXCLUSIVE-NOR gates following the transformation relationship shown in Table III. When Dout 6=1, DAC 5–DAC 0 values follow those of Dout 5–Dout 0. If Dout 6=0, states of DAC 5–DAC 0 are inverted with respect to Dout 5–Dout 0.

Figure 9:
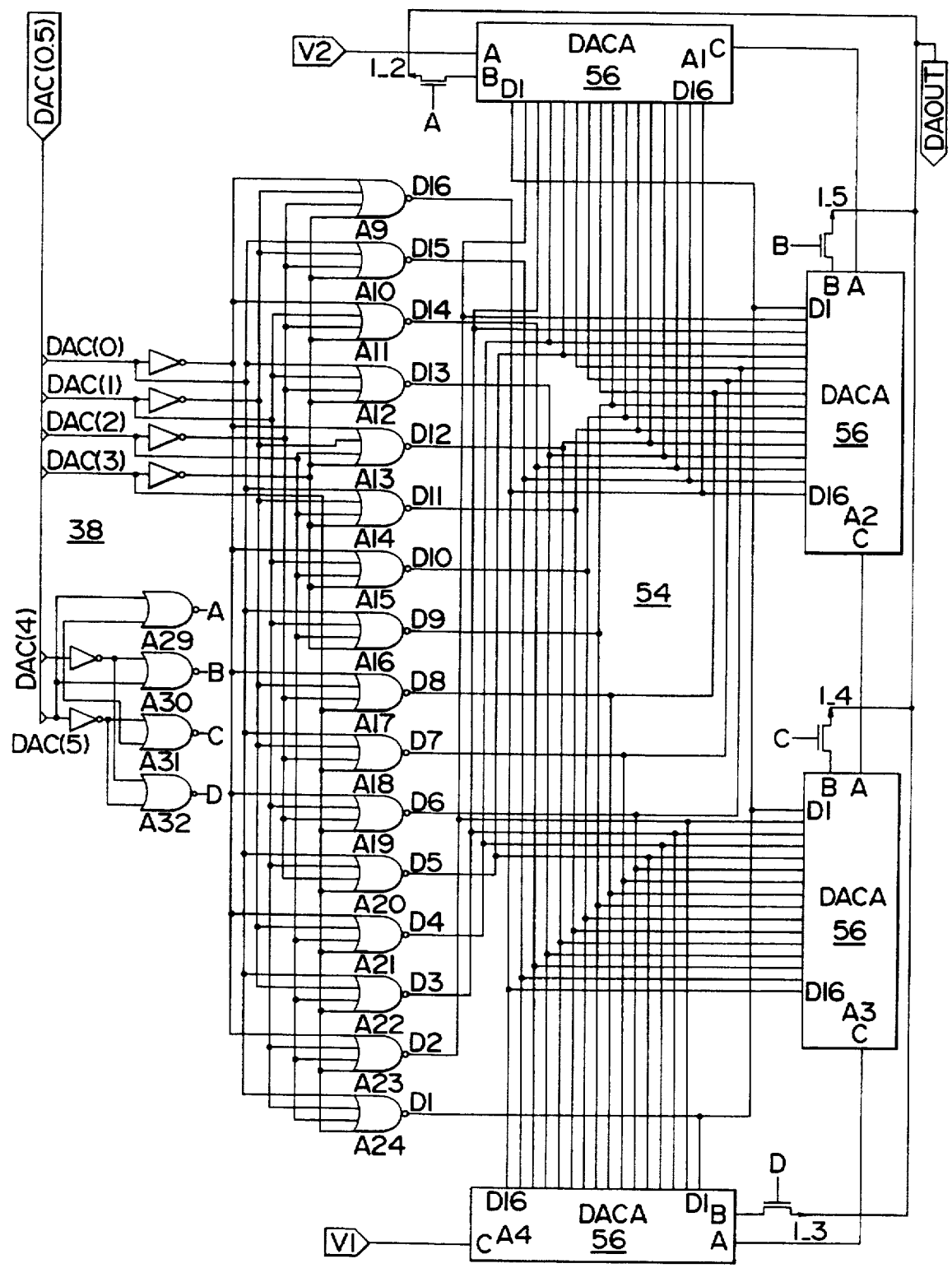

The digital-to-analog converter 34 shown in FIG. 8 is illustrated in more detail in FIG. 9. As a typical D-A converter, it comprises switches and a resistor network. The switches are represented by a logic circuitry 54 controlled by the digital code at the inputs 38 (DAC 0–DAC 5). The circuitry 54 establishes connections within the network needed to obtain the proper analog voltage. The resistor network is shown as four identical blocks 56 connected in series and addressed in parallel. One of these network blocks 56 is exemplified in FIG. 10.

The output circuit 30 shown in FIG. 5 may be an operational amplifier (LF356) 58 and a transistor (8050) shown in FIG. 11 and used as a buffer to directly drive the speaker 32.

While several embodiments of the present invention have been disclosed hereinabove, it is to be understood that these embodiments are given as examples only and not in a limiting sense. Those skilled in the art may make various modifications and additions to preferred embodiments chosen to illustrate the invention without departing from the spirit and the scope of the present contribution to the art. Accordingly, it is to be realized that the protection sought and to be afforded hereby shall be deemed to extend to the subject matter claimed and all equivalence thereof fairly within the scope of the invention.

The embodiments of the invention in which an exclusive property or privilege is claimed are defined as follows:

I claim:

1. A method of eliminating background noise in a digital sound recording and reproducing system comprising the steps of:

converting analog sound signals to digital sound signals in a speech processing unit and storing said digital sound signals in a memory means, selecting a voltage amplitude range containing substantially all background noise digital sound signals, changing said digital sound signals of said noise to digital signals that represent essentially a zero sound output within said voltage amplitude range in the course of reproducing, and converting said digital signals into an analog form, to thereby reproduce sound signals without said background noise, said changing said digital sound signals of said noise is made through selecting a quiet sound benchmark voltage, defining a number of least significant bits of said digital sound signal confining said noise, defining voltages corresponding to said number of least significant bits, and replacing said voltages within said voltage range for both positive and negative most significant bits around said benchmark voltage with said benchmark voltage.

2. The method according to claim 1, wherein said voltage amplitude range is selected between 2.236 volts and 2.664 volts.

3. The method according to claim 1, wherein said voltage amplitude range is selected between 2.266 volts and 2.687 volts.

4. An apparatus for suppressing background noise in a digital sound recording and reproducing system comprising sound processing means to convert analog sound signals into digital sound signals, means connected with said processing means for eliminating signals within a preselected voltage range characteristic for background noise, and digital-to-analog converting means controlled by said eliminating means for reproducing analog sound signals, said eliminating means includes first logic means, said first logic means being controlled by most significant bits of said digital sound signals, a number and values of said most significant bits defining said preselected voltage range; and second logic means controlled by said first logic means to zero outputs of said second logic means when a number and values of said most significant bits lie within the limits defining said preselected voltage range.

5. The apparatus according to claim 4, wherein said preselected voltage range lies between 2.236 volts and 2.664 volts.

6. The apparatus according to claim 4, wherein said preselected voltage range lies between 2.266 volts and 2.687 volts.

* * * * *